United States Patent
Courtet et al.

(10) Patent No.: US 11,466,168 B2
(45) Date of Patent: Oct. 11, 2022

(54) FREE RADICAL UV CURABLE INKJET INK SETS AND INKJET PRINTING METHODS

(71) Applicant: AGFA NV, Mortsel (BE)

(72) Inventors: Vincent Courtet, Mortsel (BE); Matthieu Retailleau, Mortsel (BE)

(73) Assignee: AGFA NV, Mortsel (BE)

( * ) Notice: Subject to any disclaimer, the term of this patent is extended or adjusted under 35 U.S.C. 154(b) by 348 days.

(21) Appl. No.: 16/758,877

(22) PCT Filed: Oct. 18, 2018

(86) PCT No.: PCT/EP2018/078558
§ 371 (c)(1),
(2) Date: Apr. 24, 2020

(87) PCT Pub. No.: WO2019/081339
PCT Pub. Date: May 2, 2019

(65) Prior Publication Data
US 2020/0392358 A1 Dec. 17, 2020

(30) Foreign Application Priority Data

Oct. 27, 2017 (EP) ..................... 17198840

(51) Int. Cl.
| | | |
|---|---|---|
| C09D 11/38 | (2014.01) | |
| C09D 11/101 | (2014.01) | |
| C09D 11/107 | (2014.01) | |
| C09D 11/322 | (2014.01) | |
| C09D 11/40 | (2014.01) | |

(52) U.S. Cl.
CPC ............ *C09D 11/38* (2013.01); *C09D 11/101* (2013.01); *C09D 11/107* (2013.01); *C09D 11/322* (2013.01); *C09D 11/40* (2013.01)

(58) Field of Classification Search
CPC ... C09D 11/107; C09D 11/101; C09D 11/322; C09D 11/54; C09D 11/38; C09D 11/40; B41M 5/0017; B41M 7/0081; B41M 5/007; B41M 5/0047
See application file for complete search history.

(56) References Cited

U.S. PATENT DOCUMENTS

| | | | | |
|---|---|---|---|---|
| 9,469,771 | B2 * | 10/2016 | Mizutaki | C09D 11/30 |
| 9,884,973 | B2 * | 2/2018 | Okamoto | C09D 11/40 |
| 10,000,649 | B2 * | 6/2018 | Okamoto | C09D 11/38 |
| 10,640,664 | B2 * | 5/2020 | Kida | B41J 2/2107 |
| 2003/0021961 | A1 | 1/2003 | Ylitalo et al. | |
| 2007/0211111 | A1 | 9/2007 | Hayata | |

FOREIGN PATENT DOCUMENTS

| | | |
|---|---|---|
| EP | 2 653 509 A1 | 10/2013 |
| EP | 2 942 204 A1 | 11/2015 |
| JP | 2013-043894 A | 3/2013 |

OTHER PUBLICATIONS

Official Communication issued in International Patent Application No. PCT/EP2018/078558, dated Jan. 30, 2019.
Thomson Scientific, Database WPI, Week 201319, AN 2013-012543, XP-002777634, 2 pages.

\* cited by examiner

*Primary Examiner* — An H Do
(74) *Attorney, Agent, or Firm* — Leydig, Voit & Mayer, Ltd.

(57) ABSTRACT

A free radical UV curable inkjet ink set includes a free radical UV curable primer containing: one or more photoinitiators; a mixture of at least two monomers according to Formula (I):

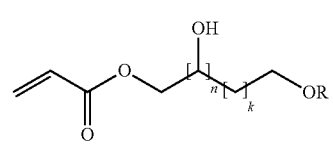

Formula (I)

wherein n represents an integer 0 or 1, k represents an integer selected from the range of 0 to 3, and R represents hydrogen or phenyl; 0.0 to 4.0 wt % of a polyfunctional monomer; 0.0 to 2.0 wt % of an organosilane coupling agent; and 0.0 to 10.0 wt % of a N-vinyllactam monomer; and one or more free radical UV curable inkjet inks containing: a colour pigment; one or more photoinitiators; and at least 50.0 wt % of one or more monoacrylate monomers; wherein the mixture of at least two monomers according to Formula (I) includes 3.0 to 50.0 wt % of a first monomer having n=1 and R representing phenyl and 35.0 to 90.0 wt % of a second monomer having n=0 and R representing phenyl.

14 Claims, No Drawings

FREE RADICAL UV CURABLE INKJET INK SETS AND INKJET PRINTING METHODS

CROSS REFERENCE TO RELATED APPLICATIONS

This application is a 371 National Stage Application of PCT/EP2018/078558, filed Oct. 18, 2018. This application claims the benefit of European Application No. 17198840.5, filed Oct. 27, 2017, which is incorporated by reference herein in its entirety.

BACKGROUND OF THE INVENTION

1. Field of the Invention

The present invention relates to free radical UV curable inkjet ink sets and inkjet printing methods for producing images durable for outdoor usage and exhibiting good adhesion characteristics, especially on difficult substrates like glass and acrylics.

2. Description of the Related Art

The production of outdoor signage, advertising and promotional displays has shifted from conventional printing techniques, such as offset printing, to inkjet printing due to its capability of short run printing variable data in an economically viable way. However, it has been observed that UV inkjet printed images over time suffer from weathering conditions, such as the image flaking off.

N-vinylcaprolactam, also known as NVC, is one of the few monofunctional monomers suitable for inkjet printing that are solid at room temperature. N-vinyllactams have been used in jettable primers or inks as a preferred monomer for obtaining good adhesion on difficult substrates, such as glass and acrylics. This is, for example, illustrated by US 2007211111 A (FUJIFILM) disclosing an ink composition comprising: (A) an N-vinyllactam; (B) a radically polymerizable compound; and (C) a polymerization initiator; the content of the N-vinyllactam (A) being at least 10 wt % of the ink total weight; and the content ratio by weight of (A):(B) being 1:8.5 to 1:1.

Early 2014 however, a classification labelling change of NVC has been advised by REACH. Every printing ink that contains more than 10 percent of NVC must be marked with R48/23: Toxic, danger of serious damage to health by prolonged exposure through inhalation (see e.g. http://www.eupia.org/uploads/tx_edm/2015-03-11_EuPIA_Customer_Information_Note_NVC.pdf). For digital inkjet inks, a temporary exemption was granted allowing continued use of NVC, since technical equivalents were not readily available.

One approach is to use a primer that is coated instead of jetted. US 2003021961 A (3M) discloses imaged articles that are durable for outdoor usage by ink jet printing radiation curable inks to primed substrates. The primers are coated on polymeric sheets and then inkjet printed with radiation curable inkjet inks. One example using a radiation curable primer is disclosed in [0197]-[0198]. The radiation curable primer is coated on a substrate, then radiation curable inkjet ink is jetted on the uncured primer and then both the primer and the inkjet ink are cured together. However, for reasons of productivity, an image-wise applied primer is desired.

Jettable primers have been investigated. For example, EP 2942204 A (AGFA) discloses a specific jettable UV curable colourless primer for producing images durable for outdoor usage on acrylic substrates, but not on glass substrates. EP 2942204 A (AGFA) discloses an inkjet printing method including the steps of: a) inkjet printing on a substrate a UV curable colourless primer including monofunctional monomers in a range of 40 wt % to 65 wt % based on the total weight of the UV curable colourless primer; b) at least partially UV curing the inkjet printed UV curable colourless primer; and c) inkjet printing on the at least partially cured UV curable colourless primer one or more UV curable colour inkjet inks including monofunctional monomers in a range of 30 wt % to 60 wt % based on the total weight of the UV curable colour inkjet inks; wherein a ratio of the wt % monofunctional monomers in the UV curable colourless primer over the wt % monofunctional monomers in the one or more UV curable colour inkjet inks is between 0.65 and 2.10.

Another approach is to search for adhesion promoters that are capable of replacing NVC. For example, US 2015184005 A (HAPA) discloses UV curable inkjet inks lacking NVC and containing an adhesion promoter in the form of pentaerythritol tetrakis(3-mercaptobutanoate) (PE1). A number of these adhesion promoters were found to be useful on substrates other than glass and acrylic substrates. Organosilane coupling agents have been proposed for improving adhesion to glass.

From the above, it should be clear that there still remains a need for UV curable inkjet ink sets and inkjet printing methods for producing images durable for outdoor usage and exhibiting good adhesion on glass and acrylic substrates.

SUMMARY OF THE INVENTION

In order to overcome the problems described above, preferred embodiments of the present invention provide a free radical UV curable inkjet ink set as set forth below.

It was surprisingly found that inkjet ink sets including inkjet inks containing substantial amounts of monoacrylate monomers in combination with a jettable primer having a specific composition was capable of providing excellent adhesion on glass and acrylic substrates, some even after being subjected to water for 24 hours at 60° C.

Further objects of the invention will become apparent from the description hereinafter.

DETAILED DESCRIPTION OF THE PREFERRED EMBODIMENTS

Definitions

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_2$ to $C_6$-alkenyl group.

Unless otherwise specified a substituted or unsubstituted alkynyl group is preferably a $C_2$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_{20}$-alkyl group including a phenyl group or naphthyl group.

Unless otherwise specified a substituted or unsubstituted aryl group is preferably a phenyl group or naphthyl group.

Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms.

Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester, amide, ether, thioether, ketone, aldehyde, sulfoxide, sulfone, sulfonate ester, sulphonamide, —Cl, —Br, —I, —OH, —SH, —CN and —NO$_2$.

The term "monofunctional", as used in monofunctional monomers and oligomers, means containing a single polymerizable group.

The term "polyfunctional", as used in polyfunctional monomers and oligomers, means containing two, three or more polymerizable groups.

The term "oligomer" means a polymerizable compound polymerized from 2 to 50 monomers.

The term "monofunctional monomers" as used in the present invention includes monofunctional oligomers.

The term "monoacrylate monomer" means a monomer or oligomer having a single acrylate group.

Free Radical UV Curable Inkjet Ink Sets

A free radical UV curable inkjet ink set according to a preferred embodiment of the present invention includes
A) a free radical UV curable primer containing:
 a1) one or more photoinitiators;
 a2) a mixture of at least two monomers according to Formula (I):

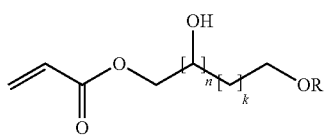

Formula (I)

wherein n represents an integer 0 or 1, k represents an integer selected from the range of 0 to 3, and R represents hydrogen or phenyl;
 a3) 0.0 to 4.0 wt % of a polyfunctional monomer;
 a4) 0.0 to 2.0 wt % of an organosilane coupling agent; and
 a5) 0.0 to 10.0 wt % of a N-vinyllactam monomer;
wherein all the weight percentages wt % are based on the total weight of the free radical UV curable prime; and B) one or more free radical UV curable inkjet inks containing:
 b1) a colour pigment;
 b2) one or more photoinitiators; and
 b3) at least 50.0 wt % of one or more monoacrylate monomers;
wherein all the weight percentages wt % are based on the total weight of the free radical UV curable inkjet ink; and wherein the mixture of at least two monomers according to Formula (I) includes 3.0 to 50.0 wt % of a first monomer having n=1 and R representing phenyl and 35.0 to 90.0 wt % of a second monomer having n=0 and R representing phenyl.

It is believed that the above mixture of at least two monomers according to Formula (I) in the primer strikes the right hydrophilic-hydrophobic balance to maximize the outdoor resistance of an inkjet printed image. Preferably no highly hydrophobic polymeric compounds, such as a polypropylene or a polybutadiene, are used in the free radical UV curable primer. Furthermore, such polymeric compound tends to increase the viscosity to an undesired level so that the free radical UV curable primer can no longer be jetted.

The mixture of at least two monomers according to Formula (I) includes 3.0 to 50.0 wt %, preferably 3.5 to 30.0 wt %, more preferably 4.0 to 27.0 wt % and most preferably 5.0 to 25.0 wt % of a first monomer having n=1 and R representing phenyl.

The mixture of at least two monomers according to Formula (I) includes 35.0 to 90.0 wt %, preferably 40.0 to 88.0 wt %, more preferably 64.0 to 86.0 wt % and most preferably 75.0 to 85.0 wt % of a second monomer having n=0 and R representing phenyl.

In a preferred embodiment, the mixture of at least two monomers according to Formula (I) includes preferably 4.0 to 27.0 wt % and more preferably 5.0 to 25.0 wt % of a first monomer having n=1 and R representing phenyl and preferably 64.0 to 86.0 wt % and more preferably 75.0 to 85.0 wt % of a second monomer having n=0 and R representing phenyl.

In a preferred embodiment, the mixture of at least two monomers according to Formula (I) includes the first monomer having n=1 and R representing phenyl in a weight ratio to the second monomer having n=0 and R representing phenyl of at least 2:1 preferably at least 2.5:1, more preferably at least 3:1 and most preferably at least 6:1.

The monomers according to Formula (I) are preferably selected from the group consisting of 2-hydroxy ethyl acrylate, 4-hydroxy butyl acrylate, 2-phenoxyethyl acrylate and 2-hydroxy-3-phenoxypropyl acrylate.

In a particularly preferred embodiment, the first monomer according to Formula (I) is 2-hydroxy-3-phenoxypropyl acrylate.

In a particularly preferred embodiment, the second monomer according to Formula (I) is 2-phenoxyethyl acrylate.

In a particularly preferred embodiment, the first monomer and the second monomer according to Formula (I) have the integer k=0.

In a preferred embodiment of the free radical UV curable inkjet ink set, the one or more monoacrylate monomers in the one or more free radical UV curable inkjet inks include at least one monomer according to Formula (I).

Organosilane coupling agents, such as an epoxygroup containing silane coupling agent, have often been suggested to improve adhesion to glass. However, in the current primer, it was found that such organosilane coupling agents had surprisingly a rather deteriorating effect on the outdoor resistance. Hence, the free radical UV curable primer contains 0.0 to 2.0 wt % of an organosilane coupling agent, preferably 0.0 to 1.5 wt % of an organosilane coupling agent, and most preferably 0.0 to 1.0 wt % of an organosilane coupling agent, wherein the weight percentage wt % is based on the total weight of the free radical UV curable primer. In a particularly preferred embodiment, the free radical UV curable primer contains no organosilane coupling agent, such as a silane (meth)acrylate monomer or an epoxygroup containing silane coupling agent.

For the sake of clarity, 0.0 wt % of a compound in an inkjet ink or primer means that the compound is not present in the inkjet ink or primer, thus also not in an amount of less than 0.01 wt %.

The free radical UV curable primer contains 0.0 to 10.0 wt % of a N-vinyllactam monomer, but most preferably the free radical UV curable primer contains no N-vinyllactam monomer. A free radical UV curable primer lacking N-vinyllactam monomer, such as N-vinylcaprolactam, poses less health risks.

The one or more free radical UV curable inkjet inks contain 0.0 to 15.0 wt %, preferably 0.0 to 10.0 wt % of a N-vinyllactam monomer, but most preferably the one or more free radical UV curable inkjet inks contain no N-vinyllactam monomer. The one or more free radical UV curable inkjet inks lacking N-vinyllactam monomer, such as N-vinylcaprolactam, pose less health risks.

The use of polyfunctional monomers in the free radical UV curable primer is minimized as their effect is detrimental on the outdoor resistance. The free radical UV curable primer contains 0.0 to 4.0 wt %, preferably 0.1 to 2.0 wt % of a polyfunctional monomer, and most preferably no polyfunctional monomer is present in the free radical UV curable primer. The one or more free radical UV curable inkjet inks contain at least 50.0 wt %, preferably at least 60.0 wt % of one or more monoacrylate monomers, most preferably at least 50.0 wt % or 60.0 wt % of monofunctional monoacrylate monomers.

The free radical UV curable primer may be white, but is preferably substantially colourless. Substantially colourless means that no colour pigment or colour dye is present in the primer, but that due to one or more photoinitiators being present, the primer may have a very slight usually yellowish hue. Preferably, the one or more photoinitiators of the primer are selected so that the primer is colourless. A preferred photoinitiator for accomplishing this is an acylphosphine oxide. The free radical UV curable primer is preferably substantially colourless, because it was observed that the outdoor resistance of an inkjet printed image on the primer was reduced by incorporation of a colour pigment, such as a white pigment. A white background under the colour inkjet image enhances the viewability or readability of the inkjet image. Therefor for outdoor resistance of the inkjet image, it is preferred to use a substantially colourless free radical UV curable primer in combination with a white free radical UV curable inkjet ink instead of a white free radical UV curable primer.

If a white free radical UV curable primer is used, then preferably the free radical UV curable white primer includes titanium dioxide as white pigment. Such a white pigment has a very high refractive index, whereby the amount of pigment needed in the primer can be minimized.

In a preferred embodiment of the free radical UV curable inkjet ink set, the one or more photoinitiators of the free radical UV curable primer and the one or more photoinitiators of the one or more free radical UV curable inkjet inks include an acyl phosphine oxide photoinitiator. Such a combination can be UV cured by using UV LEDs alone, preferred UV LEDs have an emission wavelength above 360 nm, preferably above 370 nm.

The one or more free radical UV curable inkjet inks contain at least 50.0 wt %, preferably at least 60.0 wt % and more preferably at least 70.0 wt % of one or more monoacrylate monomers. The higher the content of monoacrylate monomers, the better the outdoor resistance of the inkjet printed image.

The viscosity of the free radical UV curable primer is preferably smaller than 30.0 mPa·s, more preferably smaller than 20.0 mPa·s and most preferably smaller 16.0 mPa·s at 45° C. and at a shear rate of 1,000 s$^{-1}$. The viscosity of the radiation curable inkjet inks can be adjusted by varying the amount of specific monomers and oligomers.

The surface tension of the free radical UV curable primer is preferably from 20 to 40 mN/m at 25° C., more preferably from 23 to 35 mN/m at 25° C.

The viscosity of the one or more free radical UV curable inkjet inks is preferably smaller than 30.0 mPa·s, more preferably smaller than 20.0 mPa·s and most preferably smaller than 16.0 mPa·s at 45° C. and at a shear rate of 1,000 s$^{-1}$.

The surface tension of the free radical UV curable primer is preferably from 20 to 40 mN/m at 25° C., more preferably from 23 to 35 mN/m at 25° C. The surface tension of the one or more free radical UV curable inkjet inks is preferably smaller than the surface tension of the free radical UV curable primer.

Monofunctional Monomers

Any monofunctional monomer and oligomer capable of free radical polymerization may be used as polymerizable compound. The viscosity of the can be adjusted by varying the ratio between the monomers and oligomers. The polymerizable compounds may be any monomer and/or oligomer found in the Polymer Handbook Vol 1+2, 4th edition, edited by J. BRANDRUP et al., Wiley-Interscience, 1999.

The monofunctional monomer and oligomer preferably have an ethylenically unsaturated polymerizable group selected from the group consisting of an acrylate, a methacrylate, an acrylamide, a methacrylamide, a styrene group, a maleate, a fumarate, an itaconate, a vinyl ether, a vinyl ester, an allyl ether and an allyl ester. Most preferably, the monofunctional monomer and oligomer have an acrylate group as ethylenically unsaturated polymerizable group, as such a group provides a high curing efficiency.

Preferred monofunctional monomers are the monofunctional monoacrylate monomers of the next paragraph that contain an acrylate group as the sole polymerizable group.

Although preferably absent in ink and primer, a N-vinyllactam may be used in ink and/or primer. The N-vinyllactam is preferably a compound represented by Formula (I):

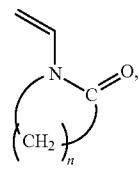

Formula (I)

wherein n denotes an integer of 2 to 6; n is preferably an integer of 3 to 5 from the viewpoint of flexibility after the ink composition is cured, adhesion to a substrate, and ready availability of starting materials, n is more preferably 3 or 5, and n is particularly preferably 5, which is N-vinylcaprolactam. N-vinylcaprolactam is preferable since it is readily available at a relatively low price, and gives particularly good ink curability and adhesion of a cured film to a recording medium.

The N-vinyllactam may have a substituent such as an alkyl group or an aryl group on the lactam ring, and may have a saturated or unsaturated ring structure bonded to the lactam ring. The compound represented by Formula (a) may be used singly or in a combination of two or more compounds.

Monoacrylate Monomers

Monoacrylate monomers in the present invention are monomers and oligomers that contain one acrylate group.

Suitable monoacrylates include isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethylhexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, 2-acryloyloxyethylsuccinic acid, 2-acryloyxyethylphthalic acid, 2-acryloxyethyl-2-hydroxyethyl-phthalic acid, lactone modified flexible acrylate, and t-butylcyclohexyl acrylate.

Other suitable monoacrylates include caprolactone acrylate, cyclic trimethylolpropane formal acrylate, ethoxyethoxyethylmethacrylate, ethoxylated nonyl phenol acrylate, isodecyl acrylate, isooctyl acrylate, octyldecyl acrylate, alkoxylated phenol acrylate, and tridecyl acrylate.

Another preferred monoacrylate monomer is a polymerizable compound according to Formula (MA):

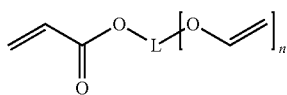

Formula (MA)

wherein,
L represents a linking group comprising two to ten carbon atoms; and
n and m independently represent a value from 1 to 3. Most preferably m represents a value of 1.

A particularly preferred monoacrylate monomer according Formula (MA) is 2-(2'-vinyloxyethoxy)ethyl acrylate.

Polyfunctional Monomers

The use of polyfunctional monomers is minimized in ink and primer for maximizing outdoor resistance, although a small amount may be benefical for providing scratch resistance.

In a preferred embodiment, the polyfunctional monomer is a polyfunctional acrylate having two or three polymerizable acrylate groups.

In a particularly preferred embodiment, the polyfunctional monomer is a duofunctional acrylate containing two polymerizable groups, preferably two acrylate groups.

Suitable polyfunctional acrylates include triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerythritol triacrylate, pentaerythritol tetraacrylate, pentaerythritolethoxy tetraacrylate, dipentaerythritol hexaacrylate, ditrimethylolpropane tetraacrylate, glycerolpropoxy triacrylate, and caprolactam modified dipentaerythritol hexaacrylate.

Other suitable difunctional acrylates include alkoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate and neopentyl glycol diacrylate.

Other higher functional acrylates include propoxylated glycerine triacrylate and propoxylated trimethylolpropane triacrylate, di-trimethylolpropane tetraacrylate, dipentaerythritol pentaacrylate, ethoxylated pentaerythritol tetraacrylate, methoxylated glycol acrylates and acrylate esters.

Preferred polyfunctional acrylates include dipropylene glycol diacrylate, tripropylene glycol diacrylate, 1,6-hexanediol diacrylate, cyclohexanone dimethanol diacrylate, polyethyleneglycol 200 diacrylate, 3-methyl 1,5-pentanediol diacrylate, pentaerythritol tetraacrylate, trimethylolpropane triacrylate and dipentaerythritol pentaacrylate.

Colorants

The colorants used in the UV curable inkjet inks can be a combination of pigments and dyes, but preferably consist of colour pigments. Organic and/or inorganic pigments may be used. Contrary to colour pigments, dyes usually do not provide sufficient light stability.

The pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley-VCH, 2004. ISBN 3527305769.

Suitable pigments are disclosed in paragraphs [0128] to [0138] of WO 2008/074548 (AGFA GRAPHICS).

In a preferred embodiment, the one or more UV curable colour inkjet inks include a UV curable yellow inkjet ink including a pigment selected from the group consisting of C.I Pigment Yellow 150, C.I Pigment Yellow 151, C.I Pigment Yellow 155 and C.I Pigment Yellow 180, more preferably selected from the group consisting of C.I Pigment Yellow 151 and C.I Pigment Yellow 155. Most preferably the UV curable yellow inkjet ink includes C.I Pigment Yellow 155.

A preferred pigment for the cyan inkjet ink is C.I. Pigment Blue 15:4.

A preferred pigment for the magenta inkjet ink is a quinacridone pigment or a mixed crystal of a quinacridone pigment.

Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia™ M Magenta RT-355-D from Ciba Specialty Chemicals.

Also mixtures of pigments may be used in the UV curable colour inkjet inks. A UV curable neutral black inkjet ink is preferred and can be obtained, for example, by mixing a black pigment and a cyan pigment and/or magenta pigment into the ink.

Non-organic pigments may be used in the pigment dispersions. Particular preferred pigments are C.I. Pigment Metal 1, 2 and 3. Illustrative examples of the inorganic pigments include red iron oxide (III), cadmium red, ultramarine blue, prussian blue, chromium oxide green, cobalt green, amber, titanium black and synthetic iron black.

Pigment particles in inkjet inks should be sufficiently small to permit free flow of the ink through the inkjet-printing device, especially at the ejecting nozzles. It is also desirable to use small particles for maximum colour strength and to slow down sedimentation.

The numeric average pigment particle size is preferably between 0.050 and 1 µm, more preferably between 0.070 and 0.300 µm and particularly preferably between 0.080 and 0.200 µm. Most preferably, the numeric average pigment particle size is no larger than 0.150 µm. An average particle size smaller than 0.050 µm is less desirable for decreased light-fastness.

However, for white pigment inkjet inks, the numeric average particle diameter of the white pigment is preferably from 150 to 500 nm, more preferably from 200 to 400 nm, and most preferably from 250 to 300 nm. Sufficient hiding power cannot be obtained when the average diameter is less than 150 nm, and the storage ability and the jet-out suitability of the ink tend to be degraded when the average diameter exceeds 500 nm. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a Malvern™ nano-S available from Goffin-Meyvis. A sample can, for example, be prepared by addition of one drop of ink to a cuvette containing 1.5 mL ethyl acetate and mixed until a homogenous sample was obtained. The measured particle size is the average value of 3 consecutive measurements consisting of 6 runs of 20 seconds.

Suitable white pigments are given by Table 2 in [0116] of WO 2008/074548 (AGFA GRAPHICS). The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548 (AGFA GRAPHICS). These white pigments may also be used in the free radical UV curable primer, if desired.

The pigments are present in the range of 0.01 to 15%, more preferably in the range of 0.05 to 10% by weight and most preferably in the range of 0.1 to 5% by weight, each based on the total weight of the inkjet ink. For white pigmented ink, the white pigment is preferably present in an amount of 3% to 30% by weight of the inkjet ink, and more preferably 5% to 25%. An amount of less than 3% by weight cannot achieve sufficient covering power and usually exhibits very poor storage stability and ejection property.

Dispersants

The dispersant may be a surfactant, but is preferably a polymeric dispersant.

Typical polymeric dispersants are copolymers of two monomers but may contain three, four, five or even more monomers. The properties of polymeric dispersants depend on both the nature of the monomers and their distribution in the polymer. Copolymeric dispersants preferably have the following polymer compositions:
  statistically polymerized monomers (e.g. monomers A and B polymerized into ABBAABAB);
  alternating polymerized monomers (e.g. monomers A and B polymerized into ABABABAB);
  gradient (tapered) polymerized monomers (e.g. monomers A and B polymerized into AAABAABBABBB);
  block copolymers (e.g. monomers A and B polymerized into AAAAABBBBBB) wherein the block length of each of the blocks (2, 3, 4, 5 or even more) is important for the dispersion capability of the polymeric dispersant;
  graft copolymers (graft copolymers consist of a polymeric backbone with polymeric side chains attached to the backbone); and
  mixed forms of these polymers, e.g. blocky gradient copolymers.

Suitable polymeric dispersants are listed in the section on "Dispersants", more specifically [0064] to [0070] and [0074] to [0077], in EP 1911814 A (AGFA GRAPHICS) incorporated herein as a specific reference.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The polymeric dispersant has preferably a polydispersity PD smaller than 2, more preferably smaller than 1.75 and most preferably smaller than 1.5.

Particularly preferred polymeric dispersants include Solsperse™ dispersants from NOVEON, Efka™ dispersants from BASF, Disperbyk™ dispersants from BYK CHEMIE GMBH. Particularly preferred dispersants are Solsperse™ 32000, 35000 and 39000 dispersants from NOVEON.

The polymeric dispersant is preferably used in an amount of 2 to 600 wt %, more preferably 5 to 200 wt %, most preferably 50 to 90 wt % based on the weight of the pigment.

Dispersion Synergists

A dispersion synergist usually consists of an anionic part and a cationic part. The anionic part of the dispersion synergist exhibiting a certain molecular similarity with the color pigment and the cationic part of the dispersion synergist consists of one or more protons and/or cations to compensate the charge of the anionic part of the dispersion synergist.

The synergist is preferably added in a smaller amount than the polymeric dispersant(s). The ratio of polymeric dispersant/dispersion synergist depends upon the pigment and should be determined experimentally. Typically the ratio wt % polymeric dispersant/wt % dispersion synergist is selected between 2:1 to 100:1, preferably between 2:1 and 20:1.

Suitable dispersion synergists that are commercially available include Solsperse™ 5000 and Solsperse™ 22000 from NOVEON.

Particular preferred pigments for the magenta ink used are a diketopyrrolo-pyrrole pigment or a quinacridone pigment. Suitable dispersion synergists include those disclosed in EP 1790698 A (AGFA GRAPHICS), EP 1790696 A (AGFA GRAPHICS), WO 2007/060255 (AGFA GRAPHICS) and EP 1790695 A (AGFA GRAPHICS).

In dispersing C.I. Pigment Blue 15:3, the use of a sulfonated Cu-phthalocyanine dispersion synergist, e.g. Solsperse™ 5000 from NOVEON is preferred. Suitable dispersion synergists for yellow inkjet inks include those disclosed in EP 1790697 A (AGFA GRAPHICS).

Photoinitiators and Co-initiators

The photoinitiator includes at least one radical photoinitiator, and preferably consists of one or more radical photoinitiators. A radical photoinitiator is a chemical compound that initiates polymerization of monomers and oligomers when exposed to actinic radiation by the formation of a free radical.

Two types of radical photoinitiators can be distinguished and used in the UV curable primer and inkjet inks of the present invention. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the present invention, alone or in combination.

In order to increase the photosensitivity further, the UV curable primer or inkjet ink may additionally contain one or more co-initiators. Suitable examples of co-initiators can be categorized in three groups:
(1) tertiary aliphatic amines such as methyldiethanolamine, dimethylethanolamine, triethanolamine, triethylamine and N-methylmorpholine;
(2) aromatic amines such as amylparadimethylaminobenzoate, 2-n-butoxyethyl-4-(dimethylamino)benzoate, 2-(dimethylamino)ethylbenzoate, ethyl-4-(dimethylamino)benzoate, and 2-ethylhexyl-4-(dimethylamino)benzoate; and
(3) (meth)acrylated amines such as dialkylamino alkyl (meth)acrylates (e.g., diethylaminoethylacrylate) or N-morpholinoalkyl-(meth)acrylates (e.g., N-morpholinoethylacrylate).
The preferred co-initiators are aminobenzoates.

Suitable photo-initiators are disclosed in CRIVELLO, J. V., et al. VOLUME III: Photoinitiators for Free Radical Cationic, 2nd edition. Edited by BRADLEY, G. London, UK: John Wiley and Sons Ltd, 1998. p. 287-294.

The at least one photoinitiator in the UV curable primer an inkjet ink is preferably an acylphosphine oxide photoinitiator. Preferred acylphosphine oxide photoinitiators include 2,4,6-trimethylbenzoyl-diphenyl-phosphine oxide available as a Darocur™ TPO (manufactured by BASF); and bis(2, 4,6-trimethylbenzoyl)-phenyl phosphine oxide available as Irgacure™ 819 (manufactured by BASF).

In a preferred embodiment, the UV curable primer includes no thioxanthone type photoinitiator, as after UV curing this often results in strong photo yellowing of the cured layer.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis(2,6-dimethylbenzoyl)-2,4,4-trimethylpentylphosphine oxide, 2,4,6 trimethylbenzoyldiphenylphosphine oxide, 2-methyl-1-[4-(methylthio)phenyl]-2-morpholinopropan-1-one, 2,2-dimethoxy-1,2-diphenylethan-1-one or 5,7-diiodo-3-butoxy-6-fluorone.

Suitable commercial photo-initiators include Irgacure™ 184, Irgacure™ 500, Irgacure™ 907, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX, Lucerin™ TPO, all available from BASF, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

In a preferred embodiment, the photoinitiator is selected from the group consisting of non-polymeric multifunctional photoinitiators, oligomeric or polymeric photoinitiators and polymerizable photoinitiators. Such a diffusion hindered photoinitiator exhibits a much lower mobility in a cured layer of the UV curable primer or inkjet ink than a low molecular weight monofunctional photoinitiator, such as benzophenone. Including diffusion hindered photoinitiators, and also diffusion hindered co-initiators do not only have a safety advantage for the operator of the inkjet printer, but are also environmentally friendly as these compounds cannot be leached out from the outdoor billboard by e.g. acid rain.

Most preferably the diffusion hindered photoinitiator is a polymerizable photoinitiator, preferably having at least one acrylate group. And most preferably the diffusion hindered coinitiator is a polymerizable coinitiator, preferably having at least one acrylate group.

Suitable diffusion hindered photoinitiator may contain one or more photoinitiating functional groups derived from a Norrish type I-photoinitiator selected from the group consisting of benzoinethers, benzil ketals, α,α-dialkoxyacetophenones, α-hydroxyalkylphenones, α-aminoalkylphenones, acylphosphine oxides, acylphosphine sulfides, α-haloketones, α-halosulfones and phenylglyoxalates.

A suitable diffusion hindered photoinitiator may contain one or more photoinitiating functional groups derived from a Norrish type II-initiator selected from the group consisting of benzophenones, thioxanthones, 1,2-diketones and anthraquinones.

Suitable diffusion hindered photoinitiators are also those disclosed in EP 2053101 A (AGFA GRAPHICS) in paragraphs [0074] and [0075] for difunctional and multifunctional photoinitiators, in paragraphs [0077] to [0080] for polymeric photoinitiators and in paragraphs [0081] to [0083] for polymerizable photoinitiators.

Other preferred polymerizable photoinitiators are those disclosed in EP 2065362 A (AGFA) and EP 2161264 A (AGFA), incorporated herein by reference.

A preferred amount of photoinitiator is 0-30 wt %, more preferably 0.1-20 wt %, and most preferably 0.3-15 wt % of the total weight of the UV curable primer or inkjet ink.

Preferred diffusion hindered co-initiators are the polymerizable co-initiators disclosed in EP 2053101 A (AGFA GRAPHICS) in paragraphs [0088] and [0097].

Preferred diffusion hindered co-initiators include a polymeric co-initiator having a dendritic polymeric architecture, more preferably a hyperbranched polymeric architecture. Preferred hyperbranched polymeric co-initiators are those disclosed in US 2006014848 (AGFA) incorporated herein as a specific reference.

The UV curable primer or inkjet ink preferably comprises a diffusion hindered co-initiator in an amount of 0.1 to 50 wt %, more preferably in an amount of 0.5 to 25 wt %, most preferably in an amount of 1 to 10 wt % of the total weight of the UV curable primer or inkjet ink.

The UV curable primer or inkjet ink preferably includes more than 6 wt %, more preferably more than 8 wt % of a phosphineoxide type photoinitiator. The phosphineoxide type photoinitiator preferably is or includes 2,4,6-trimethylbenzoyl-diphenyl-phosphineoxide. The UV curable primer or inkjet ink preferably includes no thioxanthone type photoinitiator. An advantage of these choices is that the primer after curing does exhibit a yellowish colour due to degradation products of a thioxanthone type photoinitiator, while high curing speed by UV LED can be obtained.

Polymerization Inhibitors

The UV curable primer or inkjet ink may contain a polymerization inhibitor. Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used.

Suitable commercial inhibitors are, for example, Sumilizer™ GA-80, Sumilizer™ GM and Sumilizer™ GS produced by Sumitomo Chemical Co. Ltd.; Genorad™ 16, Genorad™ 18 and Genorad™ 20 from Rahn AG; Irgastab™ UV10 and Irgastab™ UV22, Tinuvin™ 460 and CGS20 from Ciba Specialty Chemicals; Floorstab™ UV range (UV-1, UV-2, UV-5 and UV-8) from Kromachem Ltd, Additol™ S range (S100, S110, S120 and S130) from Cytec Surface Specialties.

A preferred polymerization inhibitor is Irgastab™ UV10 from BASF.

Since excessive addition of these polymerization inhibitors will lower the ink sensitivity to curing, it is preferred that the amount capable of preventing polymerization is determined prior to blending. The amount of a polymerization inhibitor is preferably lower than 2 wt % based on the total weight of the UV curable primer or inkjet ink.

Surfactants

Surfactants may used in the UV curable primer or inkjet ink to reduce the surface tension in order to improve the spreading of the UV curable primer and inkjet ink. A UV curable primer or inkjet ink must meet stringent performance criteria in order to be adequately jettable with high precision, reliability and during an extended period of time. The surface tension is not only determined by the amount and type of surfactant, but also by the polymerizable compounds and other additives in the ink composition.

The surfactant(s) can be anionic, cationic, non-ionic, or zwitter-ionic and are usually added in a total quantity less than 2 wt % based, preferably less than 1 wt % based on the total weight of the UV curable primer or inkjet ink.

Suitable surfactants include fluorinated surfactants, fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants include fluoro surfactants (such as fluorinated hydrocarbons) and silicone surfactants. The silicones are typically siloxanes and can be alkoxylated, polyether modified, polyester modified, polyether modified hydroxy functional, amine modified, epoxy modified and other modifications or combinations thereof. Preferred siloxanes are polymeric, for example polydimethylsiloxanes.

The fluorinated or silicone compound used as a surfactant may be a cross-linkable surfactant. Suitable copolymerizable compounds having surface-active effects include, for example, polyacrylate copolymers, silicone modified acrylates, silicone modified methacrylates, acrylated siloxanes, polyether modified acrylic modified siloxanes, fluorinated acrylates, and fluorinated methacrylate. These acrylates can be mono-, di-, tri- or higher functional (meth)acrylates.

Depending upon the application a surfactant can be used with a high, low or intermediate dynamic surface tension. Silicone surfactants are generally known to have low dynamic surface tensions while fluorinated surfactants are known to have higher dynamic surface tensions.

Silicone surfactants are preferred in the UV curable primer and inkjet inks of the present invention, especially the reactive silicone surfactants, which are able to be polymerized together with the polymerizable compounds during the curing step.

Examples of useful commercial silicone surfactants are those supplied by BYK CHEMIE GMBH (including Byk™-302, 307, 310, 331, 333, 341, 345, 346, 347, 348, UV3500, UV3510 and UV3530), those supplied by TEGO CHEMIE SERVICE (including Tego Rad™ 2100, 2200N, 2250, 2300, 2500, 2600 and 2700), Ebecryl™ 1360 a polysiloxone hexaacrylate from CYTEC INDUSTRIES BV and Efka™-3000 series (including Efka™-3232 and Efka™-3883) from EFKA CHEMICALS B.V.

Preparation of Pigment Dispersions and Inks

Pigment dispersions may be prepared by precipitating or milling the pigment in the dispersion medium in the presence of the dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can comprise particles, preferably substantially spherical in shape, e.g. beads consisting essentially of a polymeric resin or yttrium stabilized zirconium beads.

In the process of mixing, milling and dispersion, each process is performed with cooling to prevent build up of heat, and for UV curable pigment dispersions as much as possible under light conditions in which actinic radiation has been substantially excluded.

The pigment dispersion may contain more than one pigment. Such a pigment dispersion may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture comprise the mill grind and the milling media. The mill grind comprises pigment, polymeric dispersant and a liquid carrier. For inkjet inks, the pigment is usually present in the mill grind at 1 to 50 wt %, excluding the milling media. The weight ratio of pigment over polymeric dispersant is 20:1 to 1:2.

The milling time can vary widely and depends upon the pigment, the selected mechanical means and residence conditions, the initial and desired final particle size, etc. In the present invention pigment dispersions with an average particle size of less than 100 nm may be prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

In general it is desirable to make inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, colour, hue, saturation density, and print area coverage for the particular application.

Inkjet Printing Methods

An inkjet printing method according to a preferred embodiment of the present invention including the steps of:
a) jetting a free radical UV curable primer on a substrate; and
b) jetting one or more free radical UV curable inkjet inks on the primer;
wherein the free radical UV curable primer and the one or more free radical UV curable inkjet inks are part of a free radical UV curable inkjet ink set as defined above.

There is no real limitation on the type of substrate for inkjet printing the UV curable primer and inks of the invention on. The substrates may have ceramic, metallic, glass, wood, paper or polymeric surfaces for printing.

The substrate may be porous, as e.g. textile, paper and card board substrates, or substantially non-absorbing substrates such as e.g. a plastic substrate having a polyethylene terephthalate surface.

Preferred substrates including surfaces of polyethylene, polypropylene, polycarbonate, polyvinyl chloride, polyesters like polyethylene terephthalate (PET), polyethylene naphthalate (PEN) and polylactide (PLA) and polyimide.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of $1.10$ $g/cm^3$ or more.

In a particularly preferred embodiment of the inkjet printing method, the substrate is glass or poly(methyl methacrylate), more preferably glass.

There is no restriction on the shape of the substrate. It can be a flat sheet, such a paper sheet or a polymeric film or it can be a three dimensional object like e.g. a plastic coffee cup. The three dimensional object can also be a container like a bottle or a jerry-can for including e.g. oil, shampoo, insecticides, pesticides, solvents, paint thinner or other type of liquids.

Inkjet Printing Devices

The UV curable primer and inkjet inks are jetted by one or more print heads ejecting small droplets in a controlled manner through nozzles onto a substrate moving relative to the print head(s).

In a preferred embodiment, the inkjet printing device used for jetting the one or more UV curable colour inkjet inks on a substrate is also used for jetting the UV curable primer.

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with inkjet ink or liquid. When the voltage is again removed, the ceramic expands to its original shape, ejecting a drop of ink from the print head. However the inkjet printing method according to the present invention is not restricted to piezoelectric inkjet printing. Other inkjet print heads can be used and include various types, such as a continuous type and thermal, electrostatic and acoustic drop on demand type.

The inkjet print head normally scans back and forth in a transversal direction across the moving ink-receiver surface. Often the inkjet print head does not print on the way back. Bi-directional printing is preferred for obtaining a high areal throughput. Another preferred printing method is by a "single pass printing process", which can be performed by using page wide inkjet print heads or multiple staggered inkjet print heads, which cover the entire width of the ink-receiver surface. In a single pass printing process the inkjet print heads usually remain stationary and the ink-receiver surface is transported under the inkjet print heads.

In a particularly preferred embodiment, the inkjet printing is performed in a multiple pass printing mode. Multi-pass printing is a technique used to reduce banding in ink-jet printing. Dots of ink, when still in liquid form, tend to run together due to surface tension. This is referred to as coalescence. To print a high quality image it is important to print individual round dots. But to achieve full saturated colours, the dots must overlap to completely cover the paper. By only printing a portion of the image data so as to avoid simultaneously printing adjacent dots during each printing cycle, coalescence may be largely avoided. Additionally, by avoiding all horizontal adjacencies, the transverse speed of the printing mechanism can be increased up to two times the rated print speed of the print head.

An advantage of using a multi-pass printing mode is that the UV curable colourless primer and inkjet inks are cured in consecutive passes, rather than in a single pass, which would require a curing device with a high UV output.

Curing Devices

The UV curable primer and inkjet inks are cured by ultraviolet radiation.

In inkjet printing, the curing means may be arranged in combination with the print head of the inkjet printer, travelling therewith so that the curable composition is exposed to curing radiation very shortly after been jetted.

In such an arrangement it can be difficult to provide a small enough radiation source connected to and travelling with the print head. Therefore, a static fixed radiation source may be employed, e.g. a source of curing UV-light, connected to the radiation source by means of flexible radiation conductive means such as a fibre optic bundle or an internally reflective flexible tube.

Alternatively, the actinic radiation may be supplied from a fixed source to the radiation head by an arrangement of mirrors including a mirror upon the radiation head.

The source of radiation arranged not to move with the print head, may also be an elongated radiation source extending transversely across the ink-receiver surface to be cured and adjacent the transverse path of the print head so that the subsequent rows of images formed by the print head are passed, stepwise or continually, beneath that radiation source.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm
UV-B: 320 nm to 290 nm
UV-C: 290 nm to 100 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

In a particularly preferred embodiment, the UV curing is performed using UV LEDs, preferably have an emission wavelength above 360 nm or even 370 nm. The use of UV LEDs brings a productivity advantage, as UV LEDs consume less energy than the generally used mercury lamps and also possess a longer lifetime.

For facilitating curing, the inkjet printer often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

Printed Articles

The inkjet printing method according to the invention results in a printed article include a cured layer of the free radical UV curable primer carrying a UV cured image composed of one or more free radical UV curable inkjet inks as defined above.

In a preferred embodiment, the printed article is selected from point-of-purchase displays, billboards, vehicle graphics, backlight signage, exhibition panels, stage graphics, construction announcements, and ad panels.

EXAMPLES

Materials

All materials used in the following examples were readily available from standard sources such as Sigma-Aldrich (Belgium) and Acros (Belgium) unless otherwise specified.

PB15:4 is an abbreviation used for a C.I. Pigment Blue 15:4 pigment, available as Hostaperm™ Blue P-BFS from CLARIANT.

S35000 is an abbreviation used for SOLSPERSE™ 35000, a polyethyleneimine-polyester hyperdispersant from LUBRIZOL.

NVC is N-vinyl caprolactam available from BASF BELGIUM, NV.

IBOA is isobornylacrylate available as Sartomer™ SR506D from ARKEMA.

IDA is isodecyl acrylate available as Sartomer™ SR395 from SARTOMER.

PEA is 2-phenoxyethyl acrylate available as Sartomer™ SR339C from ARKEMA.

HPPA is 2-hydroxy-3-phenoxypropyl acrylate available as Sartomer™ CN131B from ARKEMA.

HBA is 4-hydroxy butyl acrylate available as 4-HBA from BASF.

HEA is 2-hydroxy ethyl acrylate available from TCI Europe.

THFA is tetrahydrofurfuryl acrylate available as Sartomer™ SR285 from ARKEMA.

VEEA is 2-(2'-vinyloxyethoxy)ethyl acrylate available from NIPPON SHOKUBAI, Japan.

DPGDA is dipropyleneglycoldiacrylate available as Laromer™ DPGDA from BASF.

CN963B80 is a difunctional co-initiator available as Sartomer™ CN963B80 from ARKEMA.

CN3755 is a diacrylated co-initiator available as Sartomer™ CN3755 from SARTOMER.

TPO is 2,4,6-Trimethylbenzoyl-diphenyl-phosphineoxide available as Omnirad™ TPO by IGM.

Irgacure™ 819 is a bisacylphosphineoxide photo-initiator available from BASF.

Darocur™ ITX is an isomeric mixture of 2- and 4-isopropylthioxanthone from BASF.

MPTMS is a trimethoxy silane acrylate available as Silane GF31 from WACKER-CHEMIE.

STABI-1 is 4-hydroxy-2,2,6,6-tetramethylpiperidinooxy sebacate available as Irgastab™ UV 10 from BASF.

STABI-2 is a mixture forming a polymerization inhibitor having a composition according to Table 1.

TABLE 1

| Component | wt % |
|---|---|
| DPGDA | 82.4 |
| PMF | 4.0 |
| BHT | 10.0 |
| Cupferron™ AL | 3.6 |

PMF is p-methoxy phenol.

BHT is an abbreviation for 2,6-di-tert.butyl-4-methylphenol (CASRN128-37-0) from ALDRICH CHEMICAL CO.

Cupferron™ AL is aluminum N-nitrosophenylhydroxylamine from WAKO CHEMICALS LTD.

SURF-1 is a polyether modified polydimethylsiloxane wetting agent available as BYK™ UV3510 from BYK CHEMIE GMBH.

SURF-2 is a silicone surfactant available as Silwet™ L7500 from MOMENTIVE PERFORMANCE MATERIALS.

Glass is 4 mm Planibel™ Clear, a float glass available from AGC Europe.

Barlo™ XT is a poly(methyl methacrylate) substrate available from Antalis.

Measurement Methods

1. Viscosity

The viscosity of the UV curable compositions was measured at 45° C. and at a shear rate of 1,000 s$^{-1}$ using a Rotovisco™ RV1 viscometer from HAAKE.

2. Average Particle Size

The average particle size (diameter) was determined with a Brookhaven Instruments Particle Sizer BI90plus based upon the principle of dynamic light scattering. The dispersion was diluted with ethyl acetate to a pigment concentration of 0.002 wt %. The measurement settings of the BI90plus were: 5 runs at 23° C., angle of 90°, wavelength of 635 nm and graphics=correction function.

3. Outdoor Resistance

The outdoor resistance is tested for cold weather respectively hot weather conditions by submersing a sample for 24 hours in water of 20° C. respectively of 60° C. and after drying the submersed sample at 20° C., evaluating the adhesion by a cross-cut adhesion test according to 1502409:1992(E). Paints, *International standard.* 1992 Aug. 15. using a Braive No. 1536 Cross Cut Tester from BRAIVE INSTRUMENTS with spacing of a 1 mm between cuts and using a weight of 600 g, in combination with a Tesatape™ 4104 PVC tape.

The evaluation was made in accordance with the classification described in Table 2. The classification should at least be C, to have an acceptable adhesion. A classification of A is considered to be excellent adhesion.

TABLE 2

| Classification | Observation |
|---|---|
| A | The edges of the cuts are completely smooth: none of the squares of the lattice is detached (=perfect adhesion). |
| B | Detachment of small flakes of the coating at the intersections of the cuts. A cross-cut area not greater than 5% is affected. |
| C | The coating has flaked along the edges of the cuts partly or wholly in large ribbons, and/or it has flaked partly or wholly on different parts of the squares. A cross-cut area significantly greater than 15%, but not significantly greater than 35%, is affected. |
| D | The coating has flaked along the edges of the cuts in large ribbons, and/or some of the squares has detached partly or wholly. A cross-cut area significantly greater than 35%, but not significantly greater than 65%, is affected. |
| E | Any degree of flaking that cannot even be classified by classification 4 |

4. Flaking Off

The samples were subjected to an accelerated weather conditions test for 5 weeks in a Ci4000 Weather-O-Meter™ from Atlas Material Testing Technology. The testing conditions applied were those prescribed by ISO18930. The evaluation was made in accordance with the classification described in Table 3. Samples exhibiting good flaking of properties must have a classification of 1 as this impacts the image the most.

TABLE 3

| Classification | Observation |
|---|---|
| 1 | No flaking off |
| 2 | Minor flaking off |
| 3 | Major flaking off |

Example 1

This example illustrates that the free radical UV curable primer requires a specific composition in accordance with the invention to provide good outdoor resistance on both glass and PMMA.

Preparation of Primers

The comparative UV curable colourless primers C-1 to C-17 were prepared by mixing the components according to Table 4 and Table 5. The inventive UV curable colourless primers I-1 to I-8 were prepared by mixing the components according to Table 6. The wt % is based on the total weight of the primers.

TABLE 4

| wt % of | C-1 | C-2 | C-3 | C-4 | C-5 | C-6 | C-7 | C-8 | C-9 |
|---|---|---|---|---|---|---|---|---|---|
| IBOA | 76.55 | — | — | — | — | — | — | — | — |
| PEA | — | 59.55 | 54.55 | 44.55 | 24.55 | — | 59.55 | 54.55 | 44.55 |
| HPPA | — | 25.00 | 25.00 | 25.00 | 25.00 | 25.00 | 25.00 | 25.00 | 25.00 |
| VEEA | — | 5.00 | 10.00 | 20.00 | 40.00 | 64.55 | — | — | — |
| DPGDA | — | — | — | — | — | — | 5.00 | 10.00 | 20.00 |
| TPO | 10.00 | 10.00 | 10.00 | 10.00 | 10.00 | 10.00 | 10.00 | 10.00 | 10.00 |
| CN3755 | 13.00 | — | — | — | — | — | — | — | — |
| STABI-1 | 0.35 | 0.35 | 0.35 | 0.35 | 0.35 | 0.35 | 0.35 | 0.35 | 0.35 |
| SURF-1 | 0.10 | 0.10 | 0.10 | 0.10 | 0.10 | 0.10 | 0.10 | 0.10 | 0.10 |

TABLE 5

| wt % of | C-10 | C-11 | C-12 | C-13 | C-14 | C-15 | C-16 | C-17 |
|---|---|---|---|---|---|---|---|---|
| IBOA | 64.55 | — | — | — | — | — | — | — |
| IDA | — | 64.55 | — | — | — | — | — | — |
| NVC | — | — | 64.55 | — | — | — | — | — |
| PEA | — | — | — | — | 64.55 | 39.55 | 79.55 | 64.55 |
| HPPA | 25.00 | 25.00 | 25.00 | 89.55 | — | — | — | — |
| HBA | — | — | — | — | 25.00 | 50.00 | — | — |
| HEA | — | — | — | — | — | — | 10.00 | 25.00 |
| TPO | 10.00 | 10.00 | 10.00 | 10.00 | 10.00 | 10.00 | 10.00 | 10.00 |
| STABI-1 | 0.35 | 0.35 | 0.35 | 0.35 | 0.35 | 0.35 | 0.35 | 0.35 |
| SURF-1 | 0.10 | 0.10 | 0.10 | 0.10 | 0.10 | 0.10 | 0.10 | 0.10 |

TABLE 6

| wt % of | I-1 | I-2 | I-3 | I-4 | I-5 | I-6 | I-7 | I-8 |
|---|---|---|---|---|---|---|---|---|
| PEA | 84.55 | 79.55 | 74.55 | 69.55 | 64.55 | 49.55 | 39.55 | 63.05 |
| HPPA | 5.00 | 10.00 | 15.00 | 20.00 | 25.00 | 40.00 | 50.00 | 25.00 |
| MPTMS | — | — | — | — | — | — | — | 1.50 |
| TPO | 10.00 | 10.00 | 10.00 | 10.00 | 10.00 | 10.00 | 10.00 | 10.00 |
| STABI-1 | 0.35 | 0.35 | 0.35 | 0.35 | 0.35 | 0.35 | 0.35 | 0.35 |
| SURF-1 | 0.10 | 0.10 | 0.10 | 0.10 | 0.10 | 0.10 | 0.10 | 0.10 |

Preparation of Inkjet Ink INK-C

A dispersion was made by mixing the components according to Table 7 for 30 minutes using a DISPERLUX™ disperser from DISPERLUX S.A.R.L., Luxembourg. The dispersion was then milled using a Bachofen DYNOMILL ECM mill filled with 0.4 mm yttrium stabilized zirconia beads ("high wear resistant zirconia grinding media" from TOSOH Co.). The mixture was circulated over the mill for 2 hours. After milling, the concentrated pigment dispersion was discharged over a 1 μm filter into a vessel. The resulting concentrated pigment dispersion CPC had an average particle size of 133 nm.

TABLE 7

| Component | wt % |
|---|---|
| PB15:4 | 16.00 |
| S35000 | 16.00 |
| STABI-2 | 1.00 |
| DPGDA | 67.00 |

The free radical UV curable inkjet ink INK-C was prepared using the above prepared concentrated pigment dispersion and combining it with the other components according to Table 8. The wt % is based on the total weight of the inkjet ink.

TABLE 8

| Component | wt % |
|---|---|
| PB15:4 | 2.50 |
| S35000 | 2.50 |
| NVC | 11.25 |
| IBOA | 18.95 |
| PEA | 15.00 |
| THFA | 14.12 |
| IDA | 5.00 |
| DPGDA | 10.47 |
| Sartomer™ CN963B80 | 4.00 |
| Darocur™ ITX | 2.00 |
| TPO | 2.95 |
| Irgacure™ 819 | 2.25 |
| CN3755 | 7.50 |
| STABI-2 | 0.16 |
| STABI-1 | 0.35 |
| SURF-2 | 1.00 |

Evaluation and Results

The free radical UV curable primers C-1 to C-17 and I-1 to I-8 were coated using a bar coater and a wired bar on Glass substrates and on Barlo™ XT substrates (PMMA) at a coating thickness of 6 μm. The coated samples were mounted on a belt, transporting the samples twice under a Phoseon™ 12W 395 nm LED at a speed of 20 m/min.

A first layer of the free radical UV curable inkjet ink INK-C was coated using a bar coater and a wired bar on top of the primer layer present on the glass and PMMA substrates at a thickness of 20 μm. The coated samples were mounted on a belt, transporting the samples twice under a Phoseon™ 12W 395 nm LED at a speed of 20 m/min. A second layer of the free radical UV curable inkjet ink INK-C was coated using a bar coater and a wired bar on top of the first layer at a thickness of 20 μm. The coated samples were mounted on a belt, transporting the samples twice under a Phoseon™ 12W 395 nm LED at a speed of 20 m/min.

The samples were then tested for outdoor resistance simulating cold weather (20° C.) and hot weather (60° C.) The results are shown in Table 9.

TABLE 9

| Primer | Primer Viscosity (mPa·s) | Outdoor Resistance On glass substrate Cold weather | Outdoor Resistance On glass substrate Hot weather | On PMMA Hot weather |
|---|---|---|---|---|
| None | n.a. | E | E | E |
| C-1 | 10.5 | E | E | E |
| C-2 | 11.3 | E | E | E |
| C-3 | 12.3 | E | E | E |
| C-4 | 13.1 | E | E | E |
| C-5 | 11.8 | E | E | E |
| C-6 | 8.9 | E | E | E |
| C-7 | 10.5 | E | E | A |
| C-8 | 10.5 | E | E | E |
| C-9 | 10.6 | E | E | E |
| C-10 | 10.3 | C | E | C |
| C-11 | 4.3 | E | E | D |
| C-12 | 15.6 | E | E | B |
| C-13 | 73.8 | A | E | B |
| C-14 | 5.6 | E | E | A |
| C-15 | 5.6 | E | E | C |
| C-16 | 5.5 | E | E | A |
| C-17 | 4.9 | E | E | A |
| I-1 | 9.7 | A | A | B |
| I-2 | 7.3 | A | B | A |
| I-3 | 8.0 | B | B | B |
| I-4 | 8.7 | B | B | A |
| I-5 | 9.7 | B | C | A |
| I-6 | 14.8 | A | E | A |
| I-7 | 19.5 | A | E | B |
| I-8 | 9.5 | C | E | A |

From Table 9, it should be clear that good outdoor resistance is for at least conditions simulating a cold climate was obtained for inkjet printing of primers I-1 to I-8 on both glass and PMMA. The best results were obtained using primers I-1 to I-5, which provide further also outdoor resistance simulating tropic conditions. The primer C-13 provides also good outdoor resistance for a cold climate, but has a viscosity unsuitable for inkjet printing.

Example 2

This example illustrates the inkjet printing with a free radical UV curable inkjet ink set in accordance with the invention on both glass and PMMA.

Evaluation and Results

The free radical UV curable primers C-1 and I-5 of Example 1 were used as primer in the dedicated inkjet ink set (6 colors, white and primer) of a Jeti™ Tauro H2500 LED 6C W4 P2 inkjet printer. The inkjet inks all contained more than 50.0 wt % of monoacrylate monomers.

Technical images containing squares of different optical density in cyan, magenta, yellow, black, red, green and blue were printed on glass and on PMMA (Barlo™ XT).

The flaking off was determined after treating it for 5 weeks in a Ci4000 Weather-Ometer™ from Atlas Material Testing Technology. The results are shown in Table 10.

TABLE 10

| Sample | Primer | Flaking off | |
| | | PMMA | Glass |
|---|---|---|---|
| COMP-1 | C-1 | 2 | 3 |
| INV-1 | I-1 | 1 | 1 |

The primer I-1 in accordance to the invention exhibited excellent results for flaking off on both glass and PMMA.

The invention claimed is:

1. A free radical UV curable inkjet ink set comprising:
   a free radical UV curable primer; and
   at least one free radical UV curable inkjet ink; wherein the free radical UV curable primer includes:
   at least one first photoinitiator;
   a mixture of at least two monomers according to Formula (I):

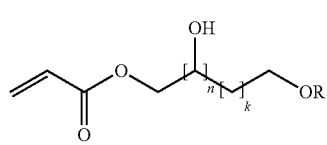

Formula (I)

in which n represents an integer 0 or 1, k represents an integer selected from the range of 0 to 3, and R represents hydrogen or phenyl;
   0.0 to 4.0 wt % of a polyfunctional monomer;
   0.0 to 2.0 wt % of an organosilane coupling agent; and
   0.0 to 10.0 wt % of a N-vinyllactam monomer; wherein all weight percentages wt % are based on a total weight of the free radical UV curable primer; and
   the mixture of the at least two monomers according to Formula (I) includes 3.0 to 50.0 wt % of a first monomer in which n=1 and R represents phenyl, and 35.0 to 90.0 wt % of a second monomer in which n=0 and R represents phenyl; and
   the at least one free radical UV curable inkjet ink includes:
   a color pigment;
   at least one second photoinitiator; and
   at least 50.0 wt % of at least one monoacrylate monomer; wherein
   all weight percentages wt % are based on a total weight of the at least one free radical UV curable inkjet ink.

2. The free radical UV curable inkjet ink set as claimed in claim 1, wherein the at least two monomers according to Formula (I) are selected from the group consisting of 2-hydroxy ethyl acrylate, 4-hydroxy butyl acrylate, 2-phenoxyethyl acrylate, and 2-hydroxy-3-phenoxypropyl acrylate.

3. The free radical UV curable inkjet ink set as claimed in claim 1, wherein k=0 for the first monomer and/or the second monomer.

4. The free radical UV curable inkjet ink set as claimed in claim 1, wherein the free radical UV curable primer is substantially colorless.

5. The free radical UV curable inkjet ink set as claimed in claim 1, wherein the free radical UV curable primer contains no organosilane coupling agent.

6. The free radical UV curable inkjet ink set as claimed in claim 1, wherein the free radical UV curable primer contains no N-vinyllactam monomer.

7. The free radical UV curable inkjet ink set as claimed in claim 1, wherein
   the at least one first photoinitiator includes an acyl phosphine oxide photoinitiator in an amount more than 6 wt % based on the total weight of the free radical UV curable primer; and
   the at least one second photoinitiator includes an acyl phosphine oxide photoinitiator in an amount more than 6 wt % based on the total weight of the at least one free radical UV curable inkjet ink.

8. The free radical UV curable inkjet ink set as claimed in claim 1, wherein the mixture of the at least two monomers according to Formula (I) consists of:
   the first monomer in which n=1 and R represents phenyl; and
   the second monomer in which n=0 and R represents phenyl.

9. The free radical UV curable inkjet ink set as claimed in claim 1, wherein the at least one free radical UV curable inkjet ink includes at least 50.0 wt % of monofunctional monoacrylate monomers.

10. The free radical UV curable inkjet ink set as claimed in claim 1, wherein the at least one free radical UV curable inkjet ink includes 0.0 to 10.0 wt % of a N-vinyllactam monomer.

11. The free radical UV curable inkjet ink set as claimed in claim 1, wherein the at least one monoacrylate monomer in the at least one free radical UV curable inkjet ink includes at least one monomer according to Formula (I).

12. An inkjet printing method comprising:
   providing the free radical UV curable primer and the at least one free radical UV curable inkjet ink from the free radical UV curable inkjet ink set as claimed in claim 1;
   jetting the free radical UV curable primer onto a substrate; and
   jetting the at least one free radical UV curable inkjet ink onto the primer.

13. The inkjet printing method as claimed in claim 12, wherein the substrate includes glass or poly(methyl methacrylate).

14. The inkjet printing method as claimed in claim 12, further comprising:
   curing the free radical UV curable primer and the at least one free radical UV curable inkjet ink using UV LEDs.

* * * * *